United States Patent [19]

Lecerf et al.

[11] 4,260,668

[45] Apr. 7, 1981

[54] POSITIVE ACTIVE MATERIAL FOR AN ELECTRIC CELL WITH A NON-AQUEOUS ELECTROLYTE

[75] Inventors: André Lecerf, Pacé; Thérése Caillaud, Neuville de Poitou, both of France

[73] Assignee: SAFT Leclanche, Poitiers, France

[21] Appl. No.: 118,760

[22] Filed: Feb. 5, 1980

[30] Foreign Application Priority Data

Feb. 16, 1979 [FR] France ................. 79 04013

[51] Int. Cl.$^3$ .................. H01M 4/02; H01M 6/16
[52] U.S. Cl. .................. 429/194; 429/199; 429/218; 423/311

[58] Field of Search ............ 429/194, 218, 199; 252/182.1; 423/311, 299, 304, 305

[56] References Cited

U.S. PATENT DOCUMENTS 3,736,184  5/1973  Dey et al. ............ 429/194

Primary Examiner—Anthony Skapars
Attorney, Agent, or Firm—Kenyon & Kenyon

[57] ABSTRACT

The invention relates to a positive active material for an electric cell with a non-aqueous electrolyte. Said active material is constituted by an oxyphosphate whose formula is $Cu_nO_p(PO_4)_2$, n being an integer greater than 3 and lower than or equal to 6 and p being equal to n-3. Application to lithium primary cells.

6 Claims, 3 Drawing Figures

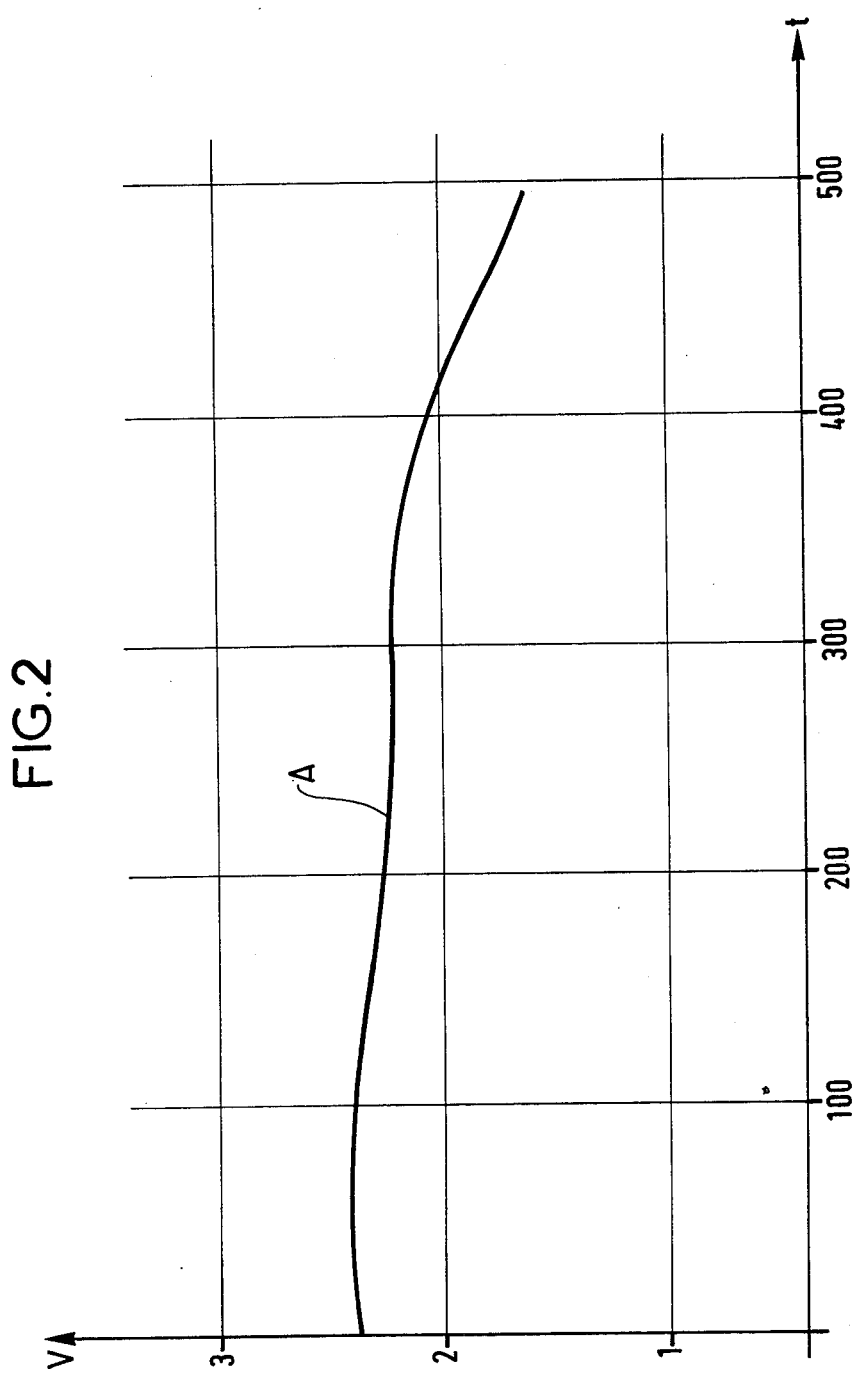

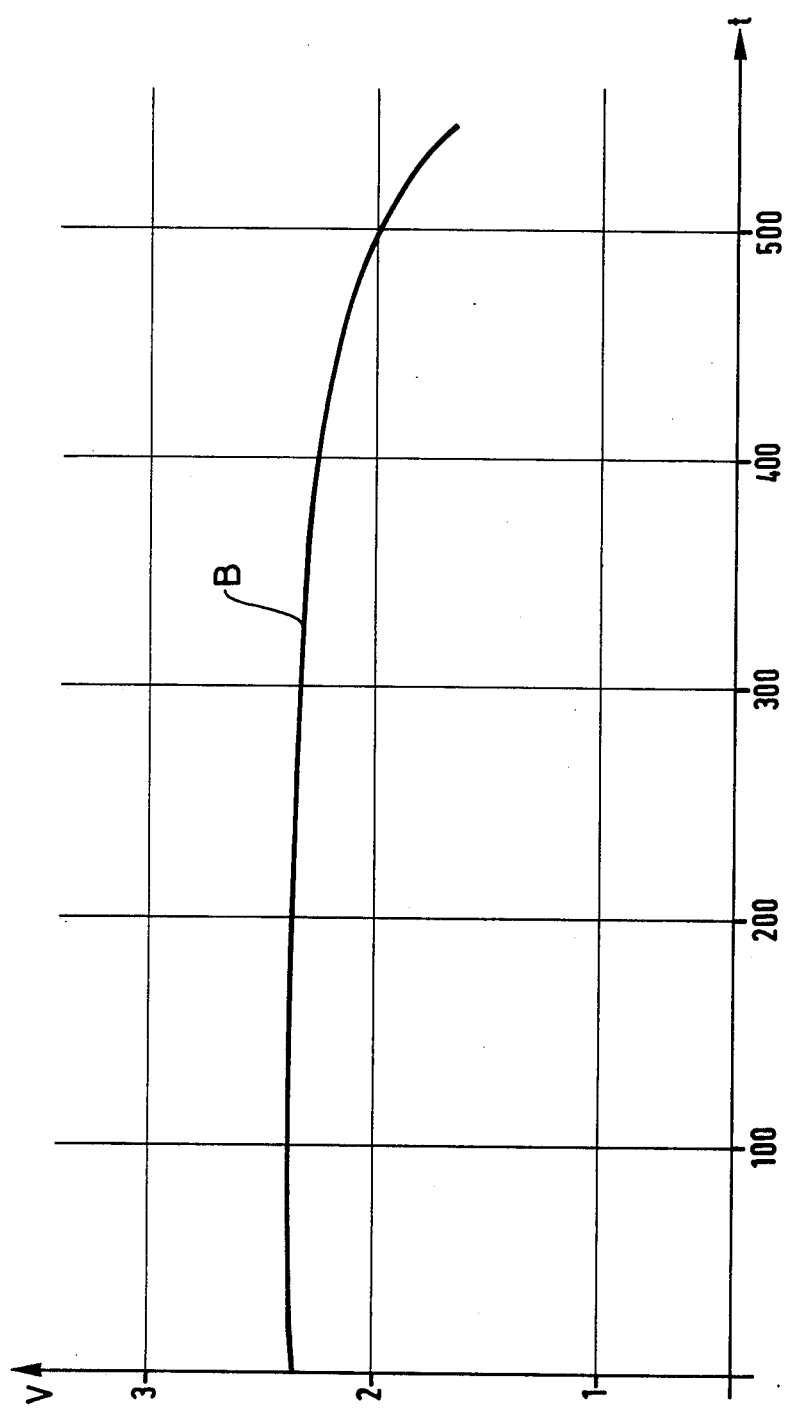

POSITIVE ACTIVE MATERIAL FOR AN ELECTRIC CELL WITH A NON-AQUEOUS ELECTROLYTE

The present invention relates to a positive active material for an electric cell with a non-aqueous electrolyte and a method of preparing said active material. It relates more particularly to a positive active material constituted by an oxygenated salt of divalent copper. Non-aqueous electrolyte means both an electrolyte constituted by a non-aqueous liquid solution and an electrolyte which is solid at ordinary temperature. In the first case at least, the negative electrode of the cell can be an alkali metal such as lithium.

U.S. Pat. No. 3,736,184 discloses a positive active material constituted by copper phosphate whose formula is given in said patent as either $Cu_3(PO_4)_2$ (tables 1 and 2) or $Cu_3(PO_4)_2 3H_2O$ (FIG. 8). In actual fact, it seems that the second formula is the correct formula, the anhydrous compound being reported only in technical literature on fundamental studies (M. C. Ball-Phase equilibrium relationship in the systems $CuO-P_2O_5$ and $Cu_2O-P_2O_5$. J. Chem. Soc. of London (A) 1968, pages 1113–11115) for which it was obtained only with the greatest difficulties.

Now, it is known that there is a disadvantage in the use of hydrated salts in primary cells whose negative electrodes are constituted by an alkali metal (in most cases lithium), namely, that the crystallization water finally attacks the alkali metal with a resulting loss of capacity during storage.

Preferred embodiments of the present invention supply positive active material for an electric cell, said material consisting of an oxygenated copper salt which is easy to prepare in the anhydrous condition, while having an adequate electrochemical behaviour.

The present invention provides a positive active material for an electric cell with a non-aqueous electrolyte constituted by an oxyphosphate whose formula is $Cu_nO_p(PO_4)_2$, n being greater than 3 and lower than or equal to 6 and p being equal to n-3. Preferably, the formula of the oxyphosphate is $Cu_4O(PO_4)_2$.

The invention also provides a method of preparing copper oxyphosphate which constitutes the above-mentioned positive active material, wherein said oxyphosphate is obtained by dehydrating a hydroxyphosphate whose formula is $Cu_2(OH)PO_4$.

The hydroxyphosphate exists in the natural state in the form of libethenite but can very easily and simply be prepared by reacting phosphoric acid with copper oxide.

Dehydration of the hydroxyphosphate begins at 520° C. The time required for dehydration (several hours) varies little as a function of the temperature up to 700° C. In contrast, substances thus obtained and used in primary cells give results which do vary as a function of the dehydration temperature. They crystallize incompletely, and the lower the dehydration temperature the worse the crystallization.

Above 700° C., on the contrary, the product crystallizes well and the dehydration speed is much higher and increases with the temperature. The compounds obtained at 900° C., for example, are obtained very rapidly (less than an hour for 500 g of material) and give good electric results when they are used in primary cells.

The oxyphosphate begins to decompose at 1020° C. Thus the dehydration temperature must not exceed 1000° C.

It should be observed that the oxyphosphate obtained by dehydration at low temperature (below 700° C.) can be transformed into a substance identical to that which is obtained by dehydration at high temperature (above 700° C.) by heating to a temperature higher than 700° C.

The invention also provides an electric cell with a non-aqueous electrolyte which contains the above-mentioned positive active material. In one advantageous embodiment, the negative active material of such an electric cell is an alkali metal, preferably lithium, and the electrolyte is a non-aqueous solution. The solvent of the electrolyte can either be an ether such as tetrahydrofuran, dimethoxyethane or dioxolane; or an ester such as propylene carbonate, ethylene carbonate (which can be used only in a solution since it is solid at ordinary temperatures) or dimethylsulphite; or a mixture of the above compounds.

The solute of the electrolyte can advantageously be lithium perchlorate. Other possible solutes are lithium tetrafluoroborate, lithium hexafluoroarsenate, lithium hexafluorophosphate and lithium trifluorosulfonate.

The invention will be better understood from the following description of several embodiments, with reference to the accompanying drawings in which:

FIG. 2 shows voltage curves as a function of time for a cell in accordance with the invention; and FIG. 3 shows an analogous curve for another cell in accordance with the invention.

Figure 1:
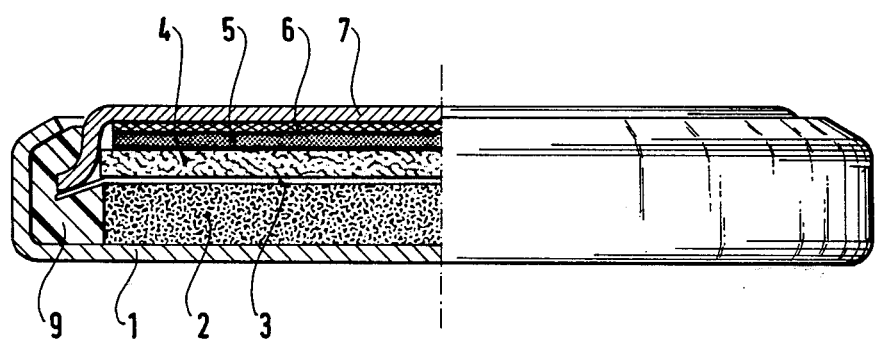
FIG. 1 is a cross-section of an electric cell in accordance with the invention.

FIG. 1 illustrates a button-type electric cell. The active components are enclosed in a casing constituted firstly by a metal cup 1 which contains the positive active mass 2 and secondly by a metal cap 7 which contains the lithium negative active mass 5 pressed onto a nickel grid 6 which is welded to the cap 7. The cup 1 and the cap 7 are fitted into each other and electrically insulated from each other by an insulating seal 9. The negative active material 5 and the positive mass 2 are separated by a barrier 3 which consists of a microporous polypropylene film and a layer 4 of glass fibres which contains the electrolyte.

The overall dimensions of the electric cell are: height 2.5 mm and diameter 25 mm. The active area is about 3 cm$^2$.

The composition of the positive active mass is as follows:

oxyphosphate $Cu_4O(PO_4)_2$: 86%
graphite: 10%
polytetrafluoroethylene: 4%

725 mg of the above mass are compressed in the cathode compartment. This corresponds to a theoretical capacity of 290 mAh.

The quantity of lithium is chosen so that it corresponds to the same theoretical capacity.

The electrolyte is a molar solution of lithium perchlorate in a mixture of 15 parts by volume of propylene carbonate with 14 parts by volume of 1,2 dimethoxyethane.

As described in detail hereinbelow, four batches of copper oxyphosphate were prepared and used as positive active material in cells of the type described hereinabove (several cells being equipped by each batch) which were each discharged through a resistance of 5000 ohms.

1st Example 537 mg of copper oxide CuO is added to 250 cm$^3$ of 85% phosphoric acid to which sufficient distilled water has been added to obtain at least 1 liter of solution. The mixture is heated to boiling point for about 6 hours, shaking continuously. The quantity of water is kept constant by a reflux system. After filtration, washing in water and drying, 785 g of hydroxyphosphate $Cu_2(OH)PO_4$ are obtained.

The hydroxyphosphate is then heated to 600° C. for more than 6 hours (until its weight is constant) and a substance (namely, copper oxyphosphate $Cu_4O(PO_4)_2$) is obtained whose density is 4.48.

FIG. 2 shows the discharge curve A of an electric cell which contains said positive active material and is discharged as stated hereinabove. Voltage is plotted along the Y axis and time t (in hours) is plotted along the X axis. The capacity of the cell is 205 mAh for an end voltage of 1.8 volts—a voltage which corresponds to an efficiency of 70%. The voltage of the cell covers two ranges—the first at a little above 2.4 volts and the second at about 2.2 volts.

2nd and 3rd Examples

Two other batches of oxyphosphate are prepared in an analogous manner but are dehydrated at 590° C. and 620° C. respectively. The results of cells which contain the materials obtained are not so good as those obtained in the first example, since for the same discharge conditions, respective capacities of 193 and 167 mAh are obtained. The discharge voltage curve has a fairly steep slope from about 2.4 volts to 1.8 volts instead of being split into level portions. Therefore, it seems that the dehydration temperature of 600° C. gives a better quality of active material than that obtained at higher or lower temperatures.

4th Example

A batch of oxyphosphate is prepared in an analogous manner, but the hydroxyphosphate is dehydrated at 900° C., dehydration being obtained in less than an hour. The oxyphosphate obtained has a density of 4.32.

A cell of the preceding type is prepared with said oxyphosphate. FIG. 3, which is analogous to FIG. 2, shows the discharge curve B of the cell. The capacity obtained is 242 mAh. This corresponds to an efficiency of 83.4%. During almost all the discharge, the voltage remains slightly below 2.4 volts.

Of course, the invention is not limited to the methods of preparation nor to the uses described hereinabove.

We claim:

1. A positive active material of an electric cell with a non-aqueous electrolyte constituted by an oxyphosphate whose formula is $Cu_nO_p(PO_4)_2$, where n is an integer greater than 3 and lower than or equal to 6 and p is equal to n-3.

2. A positive active material according to claim 1, wherein the formula of the oxyphosphate is $Cu_4O(PO_4)_2$.

3. An electric cell which includes the positive active material according to claim 1, wherein its negative active material is constituted by an alkali metal and its electrolyte is a non-aqueous solution.

4. An electric cell according to claim 3, wherein said solution includes a solvent which is a compound chosen from the group comprising: tetrahydrofuran, dioxolane, dimethoxyethane, propylene carbonate, ethylene carbonate, dimethylsulphite, and mixtures thereof.

5. An electric cell according to claim 3, wherein said solution includes a solute which is a compound chosen from the group comprising: lithium perchlorate, lithium tetrafluoroborate, lithium hexafluoroarseniate, lithium hexafluorophosphate, and lithium trifluorosulfonate.

6. An electric cell according to claim 3, 4 or 5, wherein said alkali metal is lithium.

* * * * *